US008550957B2

(12) United States Patent
Erno et al.

(10) Patent No.: US 8,550,957 B2
(45) Date of Patent: Oct. 8, 2013

(54) GEAR SYSTEM AND METHOD FOR USING SAME

(75) Inventors: Daniel Jason Erno, Clifton Park, NY (US); Fulton Jose Lopez, Clifton Park, NY (US); Darren Lee Hallman, Scotia, NY (US); Erik Karl Jacobson, Pattersonville, NY (US); Robert Michael Zirin, Niskayuna, NY (US); Munishwar Ahuja, Bangalore (IN); Stephen Bertram Johnson, Greenville, SC (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/155,417

(22) Filed: Jun. 8, 2011

(65) Prior Publication Data
US 2012/0316027 A1    Dec. 13, 2012

(51) Int. Cl.
*F16H 57/08*    (2006.01)
(52) U.S. Cl.
USPC .......................................... 475/347; 475/331
(58) Field of Classification Search
USPC .......................................... 475/347, 333, 346
See application file for complete search history.

(56) References Cited

U.S. PATENT DOCUMENTS

| | | | |
|---|---|---|---|
| 2,460,629 A * | 2/1949 | Fawick | 475/347 |
| 3,943,787 A | 3/1976 | Hicks | |
| 3,974,718 A * | 8/1976 | Kylberg | 475/347 |
| 4,700,583 A * | 10/1987 | Hicks | 74/410 |
| 5,098,359 A | 3/1992 | Chales et al. | |
| 5,558,593 A | 9/1996 | Roder et al. | |
| 5,679,089 A | 10/1997 | Levedahl | |
| 7,056,259 B2 | 6/2006 | Fox | |
| 7,806,799 B2 | 10/2010 | Smook et al. | |
| 8,172,717 B2 * | 5/2012 | Lopez et al. | 475/346 |
| 2003/0073537 A1 | 4/2003 | Lloyd | |
| 2008/0194378 A1 | 8/2008 | Fox | |
| 2010/0197445 A1 | 8/2010 | Montestruc | |
| 2010/0303626 A1 | 12/2010 | Mostafi | |
| 2012/0028754 A1 * | 2/2012 | Lopez et al. | 475/331 |

FOREIGN PATENT DOCUMENTS

| | | |
|---|---|---|
| DE | 10334824 A1 | 5/2005 |
| EP | 1580459 A2 | 9/2005 |
| EP | 2518367 A1 | 10/2012 |
| JP | 63231036 A | 9/1988 |
| JP | 8170695 A | 7/1996 |

OTHER PUBLICATIONS

Search Report and Written Opinion from corresponding EP Application No. 12170272.4-1752 dated Mar. 13, 2013.

* cited by examiner

*Primary Examiner* — Justin Holmes
*Assistant Examiner* — Terry Chau
(74) *Attorney, Agent, or Firm* — Ann M. Agosti

(57) ABSTRACT

A planetary gear system and a method. The planetary gear system includes a carrier body configured to receive planet gears, at least one pin received by the carrier body, and flex means positioned between the carrier body and the at least one pin. The method includes preparing the carrier, upon which a plurality of planet gears is mounted through planet pins, and providing flex means between the planet pins and the carrier, the flex means configured to enable movement of the planet pins in response to a force directed thereon.

6 Claims, 15 Drawing Sheets

GEAR SYSTEM AND METHOD FOR USING SAME

FIELD

The invention relates to a gear system, and more particularly, to a gear system with planet pins, for anchoring planet gears, which centralize the load on each of the planet gears and balance the load between the planet gears.

BACKGROUND

Planetary gear systems are known. Examples of planetary gear systems may be found in U.S. Pat. Nos. 6,994,651 and 7,297,086 and U.S. Patent Pubs. 2011/0039654 and 2011/0053730.

One such system, an epicyclic gear system 10, is shown in cross-section in FIG. 1 to include a planet pin 12 about which a sleeve 22 is disposed. A planet gear 26 encompasses the sleeve 22 and is connected thereto through a rib ring 30. The planet pin 12 includes a groove 14 at a central location thereof. The sleeve 22 includes a tapered landing 24. The planet gear 26 has an indent 28. Rollers 32 are positioned between races found on an inner surface of the planet gear 26 and races found on an outer surface of the sleeve 22.

The planet pin 12 is press fit to an upwind carrier plate (not shown). The gear system 10 acts as a double joint system that allows the planet gear 26 to align to a ring gear and a sun gear (not shown) despite planet pin's 12 tangential location and misalignment. There is a gap 24 between the sleeve 22 and the planet pin 12 to allow relative motion and adjustment of the planet pin 12 for rotational and tangential dislocation due to forces being exerted on the planet gear 26.

Planetary gear systems, such as system 10, find use in applications such as wind turbines. Other potential applications can be found in mill operations, the oil and gas industry, and the aviation industry.

For known planetary gear systems utilizing multiple planet gears, a problem that has developed is the creation of an unbalanced load among the planet gears. As a rotating member—depending upon the gear system, the ring gear, the carrier, or the sun gear may supply an input to the gearbox—rotates, it places a force, or a load, on the planet gears. The load factor $K_\gamma$ of a planetary gear system may be defined as:

$$K_\gamma = T_{Branch} N_{CP}/T_{Nom}$$

Where $T_{Branch}$ is the torque for the gear with the heaviest load, $N_{CP}$ is the number of planets, and $T_{Nom}$ is the total nominal torque for the system. Ideally, the force should be the same on each planet gear, i.e., $K_\gamma=1.0$, thereby creating a balanced load. However, for a variety of reasons planetary gear systems often suffer from unbalanced loads.

One reason for unbalanced loads is that the gear teeth of the planetary gears are manufactured with a normal variance for such teeth. For example, the thickness of the gear teeth may vary to an extent expected of tolerances for gear teeth. Additionally, the pitch—the distance between adjacent gear teeth—also may vary.

Under normal manufacturing practices, the planet pin holes in the carrier will be drilled away from their centric true positions. This is due to manufacturing tolerance limitations, complexity of the machined part, measuring capability, and human error. This scenario causes (1) planet pins to be out of alignment from the central shaft, and (2) each planet gear to carry a load different from what they are designed for. Under normal loading conditions, the carrier may twist slightly. This twist may contribute to the misalignment between the planet gears and the ring gear/sun gear assembly. Depending on the number of planets and their respective tolerances, loads experienced by any single planet can increase dramatically, as much as 2× or more.

Reducing the load factor $K_\gamma$ on a gear system will allow smaller system components to be utilized or allow greater loads on system components than are currently placed. A more evenly distributed shared load may allow for an increase in the gearbox torque density.

With some of these concerns in mind, a planetary gear system that includes planetary gears that self-align as they mesh with a ring and a centralized sun gear would be welcome in the art.

SUMMARY

An embodiment of the invention includes a planetary gear system that includes a carrier body configured to receive planet gears, at least one pin received by the carrier body, and an insert positioned between the carrier body and the at least one pin.

In an aspect, the flex means includes an inner ring, an outer ring, a pair of stabilizers connecting the inner and outer rings, and a stopper material positioned between the inner and outer rings.

An embodiment of the invention includes a planetary gear system that includes a carrier body configured to receive planet gears, at least one pin received by the carrier body, and a compliant insert positioned within a cut-out portion formed on an interior surface of the carrier body.

An embodiment of the invention includes a method for balancing a load on a planetary gear system that has a plurality of planet gears mounted on a carrier through a plurality of planet pins. The method includes preparing the carrier and providing flex means between the planet pins and the carrier, the flex means configured to enable movement of the planet pins in response to a force directed thereon.

These and other features, aspects and advantages of the present invention may be further understood and/or illustrated when the following detailed description is considered along with the attached drawings.

DETAILED DESCRIPTION

The present specification provides certain definitions and methods to better define the embodiments and aspects of the invention and to guide those of ordinary skill in the art in the practice of its fabrication. Provision, or lack of the provision, of a definition for a particular term or phrase is not meant to imply any particular importance, or lack thereof; rather, and unless otherwise noted, terms are to be understood according to conventional usage by those of ordinary skill in the relevant art.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable.

The modifier "about" used in connection with a quantity is inclusive of the stated value and has the meaning dictated by the context (e.g., includes the degree of error associated with measurement of the particular quantity). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Embodiments of the invention are intended to better accommodate pin misalignment relative to the central shaft, to more evenly distribute the force along the planet gear tooth width, and to more evenly share the loading among the various planet gears.

Figure 1:
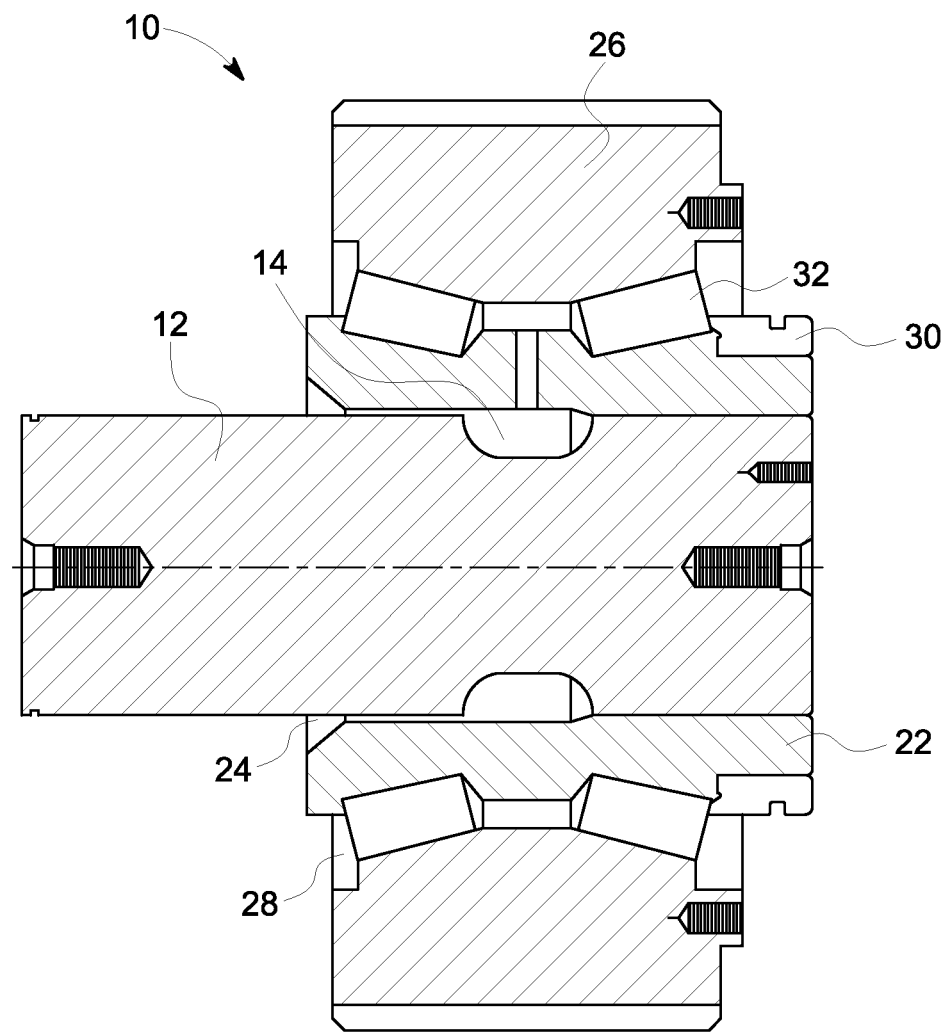
FIG. 1 is a cross-sectional view of a conventional planet gear system.
Figure 2:
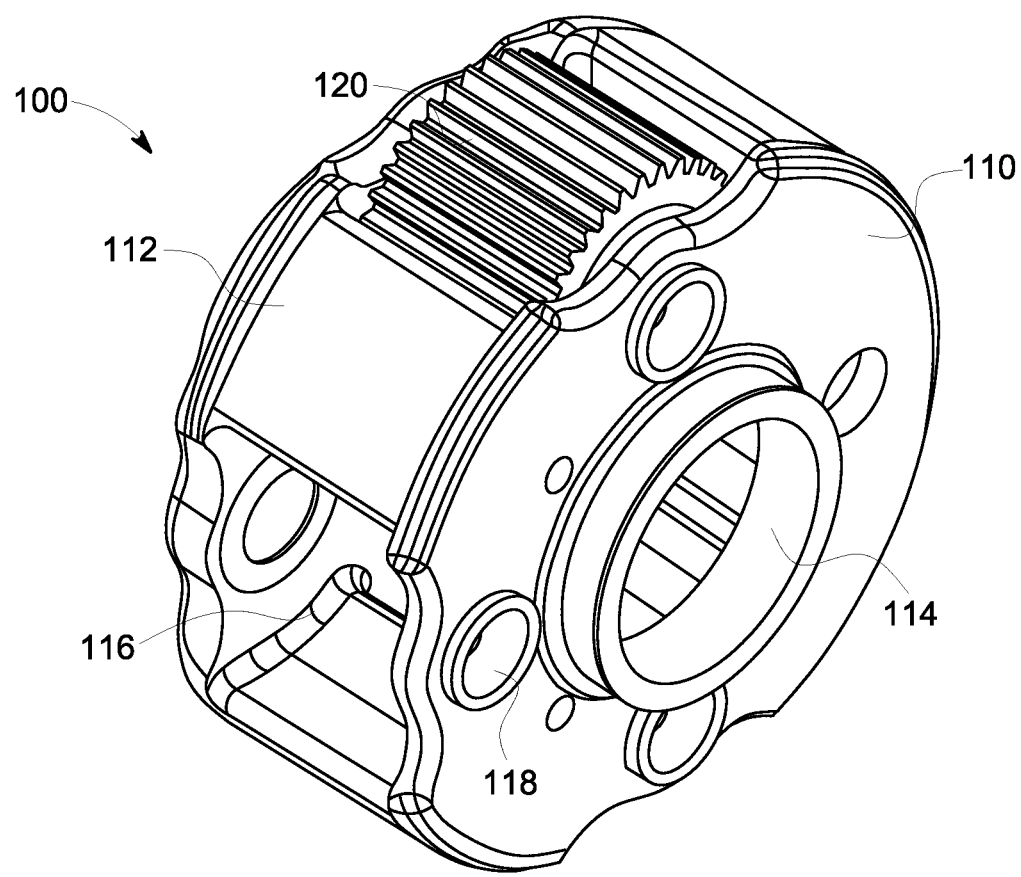
FIG. 2 is a schematic view illustrating a carrier and one planet gear in accordance with an embodiment of the invention.

FIG. 2 illustrates a planetary gear system 100 including a carrier 110 and a planet gear 120. The carrier 110 has a carrier body 112 which includes a sun gear opening 114, a plurality of planet gear openings 116, and a plurality of planet pin openings 118. The planet pin openings 118 serve as anchoring points for planet pins, about which each planet gear 120 is disposed. A portion of each planet gear 120 protrudes through a respective planet gear opening 116. Although only a single planet gear 120 is illustrated in FIG. 2, it is to be understood that four such planet gears 120 are intended for mounting on the carrier 110 of FIG. 2. Further, it is to be understood that more or less than four planet gears 120 may be mounted on a carrier, depending upon the need and the configuration of the carrier.

Figure 3:
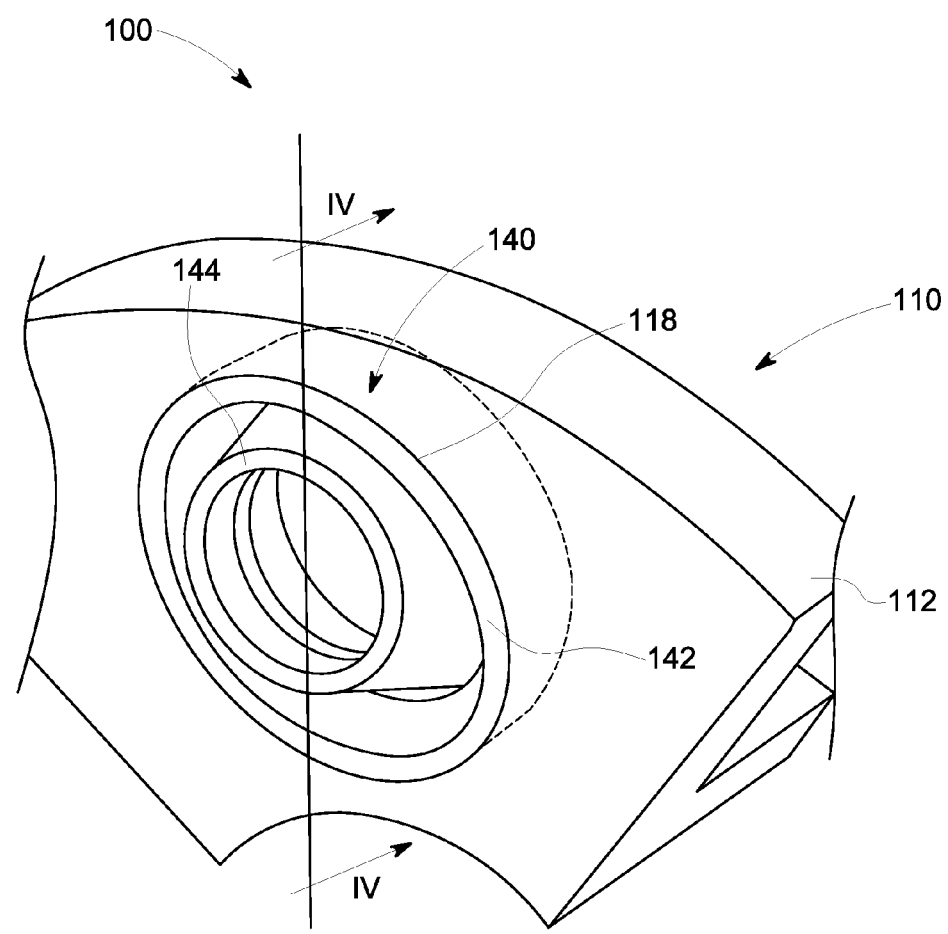
FIG. 3 is a schematic partial view of the planet gear of FIG. 2 in accordance with an embodiment of the invention.
Figure 4:
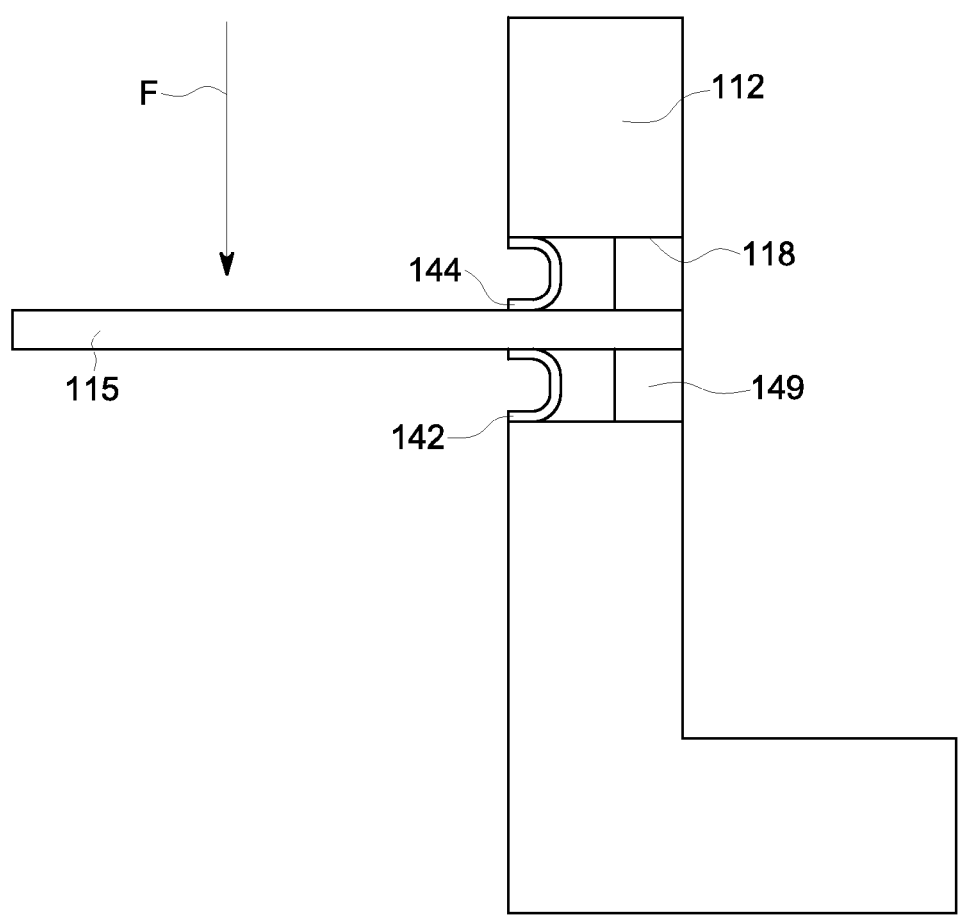
FIG. 4 is a cross-sectional view of the planet gear of FIG. 3 taken along line IV-IV and including a pin.

FIGS. 3 and 4 illustrate the planetary gear system 100 of FIG. 2 in greater clarity. As shown, the planetary gear system 100 includes a spring insert 140 through which a planet pin 115 (FIG. 4) may extend. Specifically, the spring insert 140 is a toroid-shaped object that includes an outer flange 142 surrounding an inner flange 144. The spring insert 140 may be may be sized to cause an interference fit within the planet pin opening 118. It should be appreciated, however, that there are a plurality of attachment methods and mechanisms that can be used. One process for shrink fitting the spring insert 140 is to cool the insert down; the fit being created when the insert 140 warms back up. The spring insert inner flange 144 is configured to fit around the planet pin 115. The spring insert 140 provides flexure to the planet pins 115 to accommodate manufacturing tolerances and pin misalignments. The spring insert 140 is formed of a high strength metal, such as a high strength steel. Further, the geometry and the thinness of the spring insert 140 is such as to allow springiness, or flexure, of the insert. The springiness is translated to the planet pins 115. As shown in FIG. 4, a bushing 149 may be located within the planet pin openings 118 to ensure the pin 115 remains in place.

As a force F is applied to the planet pin 115, one side of the inner flange 144 will flex toward the outer flange 142. This flexure is elastic; as the force F is removed from the pin 115, the flanges 142, 144 return to their steady state positions. Although shown with open ends of the flanges 142, 144 extending inwardly from the carrier body 112, it should be understood that the open ends of the flanges 142, 144 could instead face outwardly from the carrier body 112.

Figure 5:
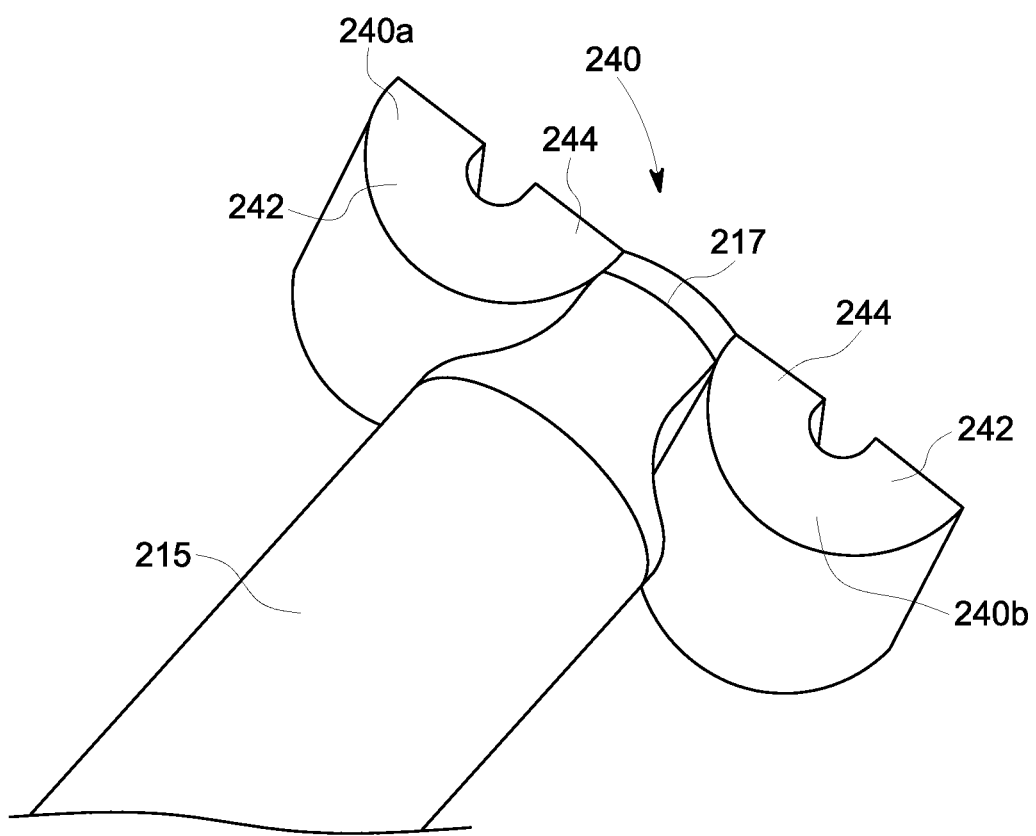
FIG. 5 is a schematic view of a planet pin in accordance with an embodiment of the invention.

FIG. 5 illustrates an embodiment of an insert and a planet pin, the planet pin 215 having an extrusion portion 217. The body of the pin 215 slopes down to the substantially rectangular-shaped extrusion portion 217. Engaged with the extrusion portion 217 is an insert 240 having a first part 240a and a second part 240b. Each of the first and second parts 240a, 240b has an outer flange 242 and an inner flange 244. The insert 240 acts similarly as the insert 140; the major difference being that the insert 240 flexes in only on direction, whereas the insert 140 has the capability of flexing in any direction. As shown, the portion of the pin 215 sloping toward the extrusion portion 217 is configured to accommodate the sloping portion of the first and second parts 240a, 240b. It should be understood, however, that the first and second parts 240a, 240b may be reversed such that the open ends of the outer and inner flanges 242, 244 face toward the sloping portion of the pin 215.

Figure 6:
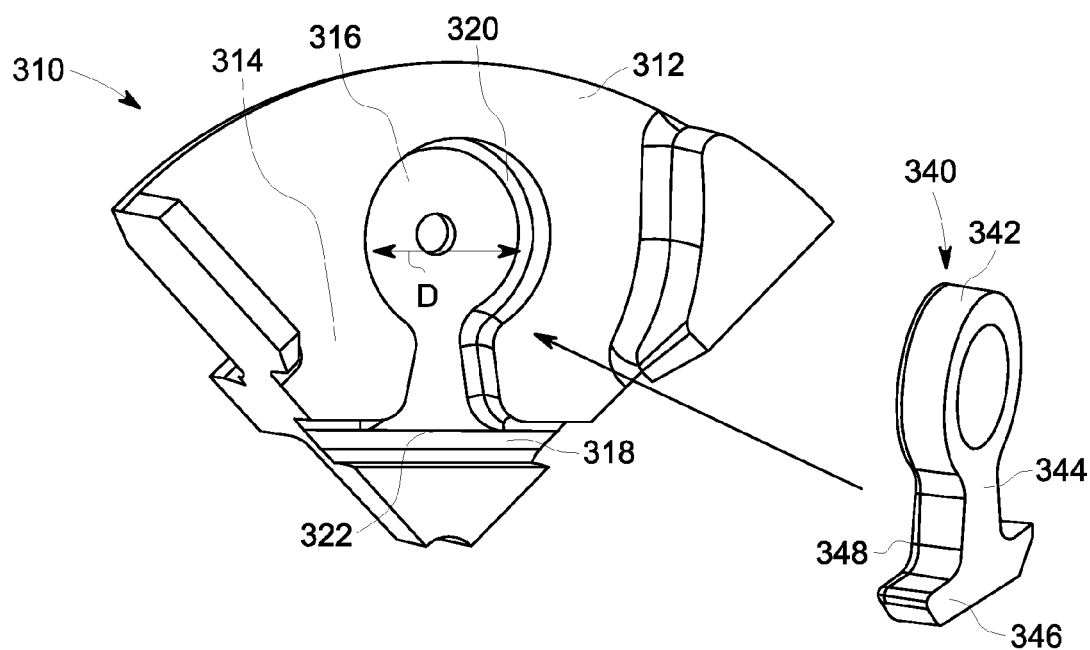
FIG. 6 is a partial perspective view of a carrier and an insert in accordance with an embodiment of the invention.

FIG. 6 illustrates a carrier 310 according to an embodiment of the invention. The carrier 310 includes a carrier body 312 which has an inner surface 314. Cut-out portions 316, 318 are contiguous with one another and are located on the inner surface 314. A beveled edge 320 extends around the contour of at least the ring/neck cut-out portion 316 and may extend into the base cut-out portion 318. An oil passage is located in the middle of cut-out portion 316. A step-down line 322 may be located at a transition position between the ring/neck cut-out portion 316 and the base cut-out portion 318.

An insert 340 is formed to fit within the cut out portions 316, 318. The insert 340 includes a ring portion 342 extending from a neck portion 344. The ring portion 342 is configured to receive a pin (not shown). A base portion 346 extends outwardly from a lower extent of the neck portion 344. On a back surface of the insert 340 is a beveled surface 348.

There is no gap between the insert 340 and the cut-out portion 318 below the step-down line 322. Thus, properly configured, the cut-out portion 318 and the insert 340 are configured and sized such that there is an interference fit therebetween. The cut-out portion 316 and the ring and neck portions 342, 344 are configured and sized such that there is a slight gap therebetween. The gap allows the ring portion 342 and the neck portion 344 to move slightly in the direction D within the cut-out portion 316 due to force placed on the pin (not shown). The gap between the ring and neck portions 342, 344 and the cut-out portion 316 is sized to allow normal operating torque but not extreme torque. When extreme torque is experienced, the ring portion 342 contacts the beveled edge 320 of the cut-out portion 316, allowing the carrier 310 to share the increased load.

Although only one pin position is shown in FIG. 6, it should be understood that cut-out portions 316, 318 are created at all the pin positions for the carrier 310 such that inserts 340 are enabled to be fit within the cut-out portions.

The insert 340 has geometry that is more compliant, or more flexible, than the material used to form the carrier 310. Further, the material forming the insert 340 may be a high strength material that has a greater yield strength than the material used to form the carrier 310. For example, the carrier 310 may be formed of cast iron, whereas the insert 340 may be formed of steel. The high strength of the insert 340, plus the shape of the insert, gives the insert suitable flexibility. The greater compliance of the insert 340 is translated to the pin held therein, thus assisting in providing a more even load share between pins.

Figure 7:
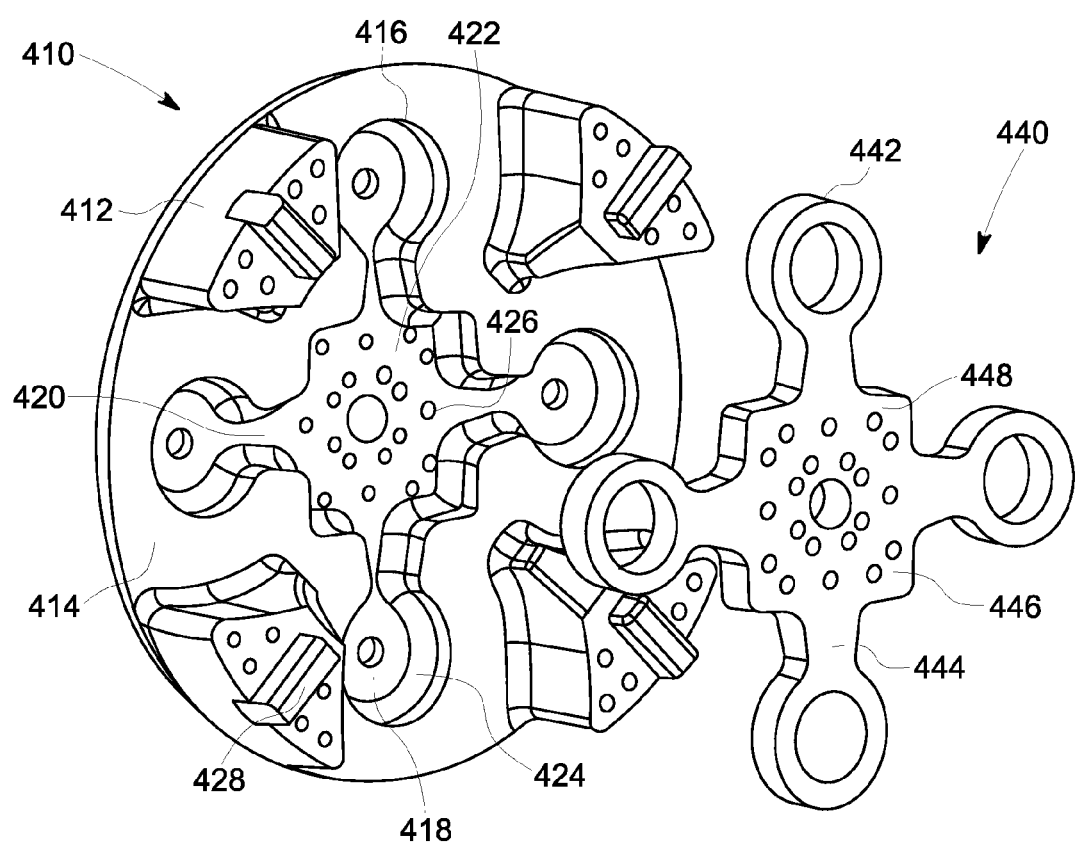
FIG. 7 is a perspective view of a carrier and an insert in accordance with an embodiment of the invention.

FIG. 7 illustrates a carrier 410 and an insert 440 according to an embodiment of the invention. The carrier 410 includes a carrier body 412 having a carrier inner surface 414. An insert cut-out portion 416 is located in the inner surface 414. The insert cut-out portion 416 includes a central cut-out portion 422 from which radially extend a plurality of ring cut-out portions 418 and neck cut-out portions 420. A beveled edge 424 extends along a periphery of the insert cut-out portion 416. Attachment openings 426 are located throughout the central cut-out portion 422.

Further illustrated in FIG. 7 is an insert 440 that includes a central portion 446 from which a plurality of neck portions 444 and ring portions 442 radially extend. The ring portions 442 are configured to each receive a pin (not shown). A plurality of attachment openings 448 is located in the central portion 446. As shown, there are four ring and neck portions 442, 444 extending radially from the central portion and four mating cut-out portions 418, 420. It should be understood that any number of ring and neck portions and mating cut-out portions may be formed.

The insert cut-out portion 416 and the insert 440 are sized and configured such that the central portion 446 does not move within the central cut-out portion 422, but the ring and neck portions 442, 444 can move slightly within, respectively, the ring cut-out and neck cut-out portions 418, 420. Specifically, the central portion 446 may be sized to cause an interference fit within the central cut-out portion 422 such that there is no gap therebetween. Alternatively, attachment means may be placed through several attachment openings 448 and through respective attachment openings 426 to attach the insert 440 to the carrier 410.

Through either attachment scenario, a gap exists between the ring and neck cut-out portions 418, 420 and the ring and neck portions 442, 444 of the insert to allow for some tangential movement of the ring and neck portions 442, 444 induced by a force exerted on a pin (not shown). The gap between the ring and neck portions 442, 444 and the cut-out portions 418, 420 is sized to allow normal operating torque but not extreme torque. When extreme torque is experienced, the ring portion 442 contacts the beveled edge 424 of the cut-out portion 418, allowing the carrier 410 to share the increased load.

The shape of insert 440 is more compliant, or more flexible, than the carrier 410. The material forming the insert 440 is a high strength material that has a greater yield strength than the material used to form the carrier 410. For example, the carrier 410 may be formed of cast iron, whereas the insert 440 may be formed of steel. The greater compliance of the insert 440 is translated to the pin held therein, thus assisting in providing a more even load sharing among pins.

The insert 440 is sized and positioned such that the carrier 410 is split into two portions. Alternatively, as shown in FIG. 6, the insert may be sized and positioned such that the carrier need not be split into two portions to accommodate it. Although only one carrier portion and one insert 440 are illustrated, it should be understood that each carrier portion may accommodate an insert 440. Since the carrier 410 is in two portions, it has to be re-formed in such a way as to inhibit shear forces from separating the carrier portions from each other. A shear block 428 may be utilized, along with attachment means such as bolts or screws to recombine the carrier portions together once the inserts 440 have been put in place.

Figure 8:
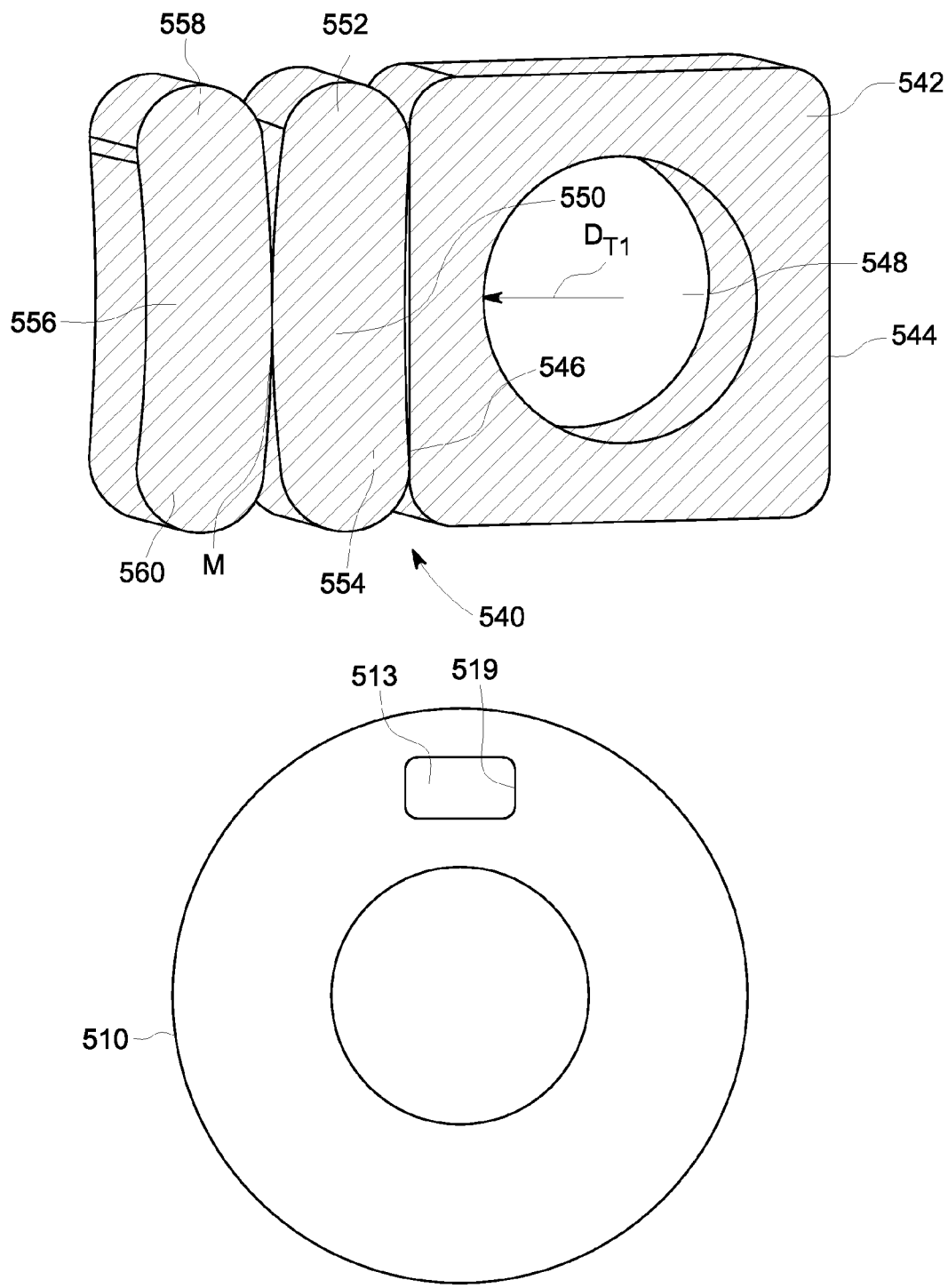
FIG. 8 is a perspective view of a carrier and an insert in accordance with an embodiment of the invention.

FIG. 8 illustrates a carrier 510 and an insert 540 according to another embodiment of the invention. As shown, the carrier 510 includes an opening 513 having a wall 519. It is to be understood that the carrier 510 will have a plurality of openings 513, one being shown for ease of illustration. The openings 513 are located at a periphery of the carrier 510. The insert 540 includes an insert body 542 and first and second springs 550, 556. The insert body 542 includes a first surface 544 and an opposing second surface 546 as well as a pin opening 548. The first spring 550 has a first end 552 and an opposing second end 554. The second spring 556 has a first end 558 and an opposing second end 560.

The insert 540 is placed within the opening 513 such that the first surface 544 contacts the wall 519. Specifically, the insert 540 and the opening 513 may be configured and sized such that the insert 540 is under tension when in place within the opening 513. The first and second springs 550, 556 are sized and formed of a material that allows for flexing. When exposed to a tangential force, the first spring 550 flexes such that the first and second ends 552, 554 contact the second surface 546. The second spring 556 flexes such that the first and second ends 558, 560 contact the wall 519 of the opening 513. The flexing of the first and second springs 550, 556 is such that they contact one another at a midpoint M. When a tangential force is exerted on a planet pin in a direction $D_{T1}$, the first and second springs 550, 556 provide flexure to the pin. The insert 540 will not exhibit flexure in response to a tangential force in a direction opposite direction $D_{T1}$. Nonetheless, the inserts 540 can be installed to allow for flexing in both tangential direction $D_{T1}$ and the opposite direction. It should be further understood that more or less than two springs may be utilized with the insert body 542.

Figure 9:
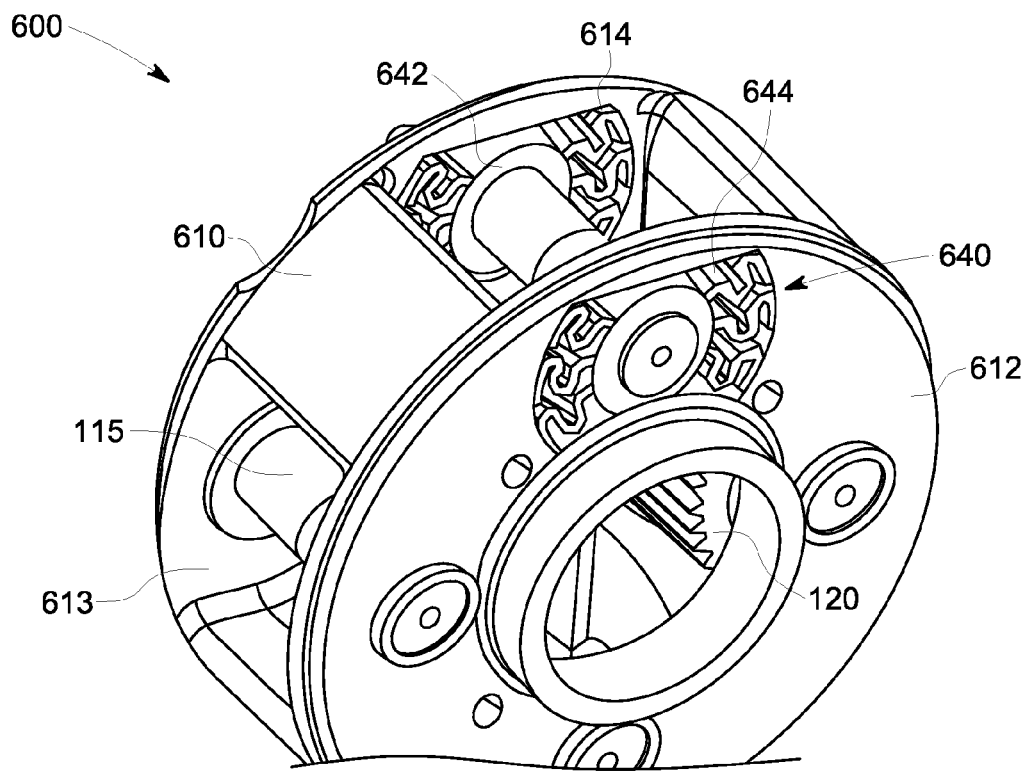
FIG. 9 is a perspective view of a carrier and an insert in accordance with an embodiment of the invention.

FIG. 9 illustrates a planetary gear system 600 including a carrier 610 and inserts 640 according to an embodiment of the invention. The carrier 610 has a carrier body 612 with a plurality of planetary gear openings 613 through which planetary gears, such as the planetary gear 26, extend. The carrier 610 also has a plurality of carrier openings 614. The openings 614 are paired on opposing sides of the carrier body 612.

Each insert 640 includes an insert ring 642 from which extend a plurality of insert springs 644. The insert rings 642 are configured to receive planet pins 115. The inserts 640 are sized and shaped to form an interference fit with the openings 614. The springs 644 are sized and formed of a material that allow for flexing in response to a tangential force exerted on the pins 115. The springs 644 may be S-shaped or shaped otherwise, and they may be formed of steel.

Figure 10:
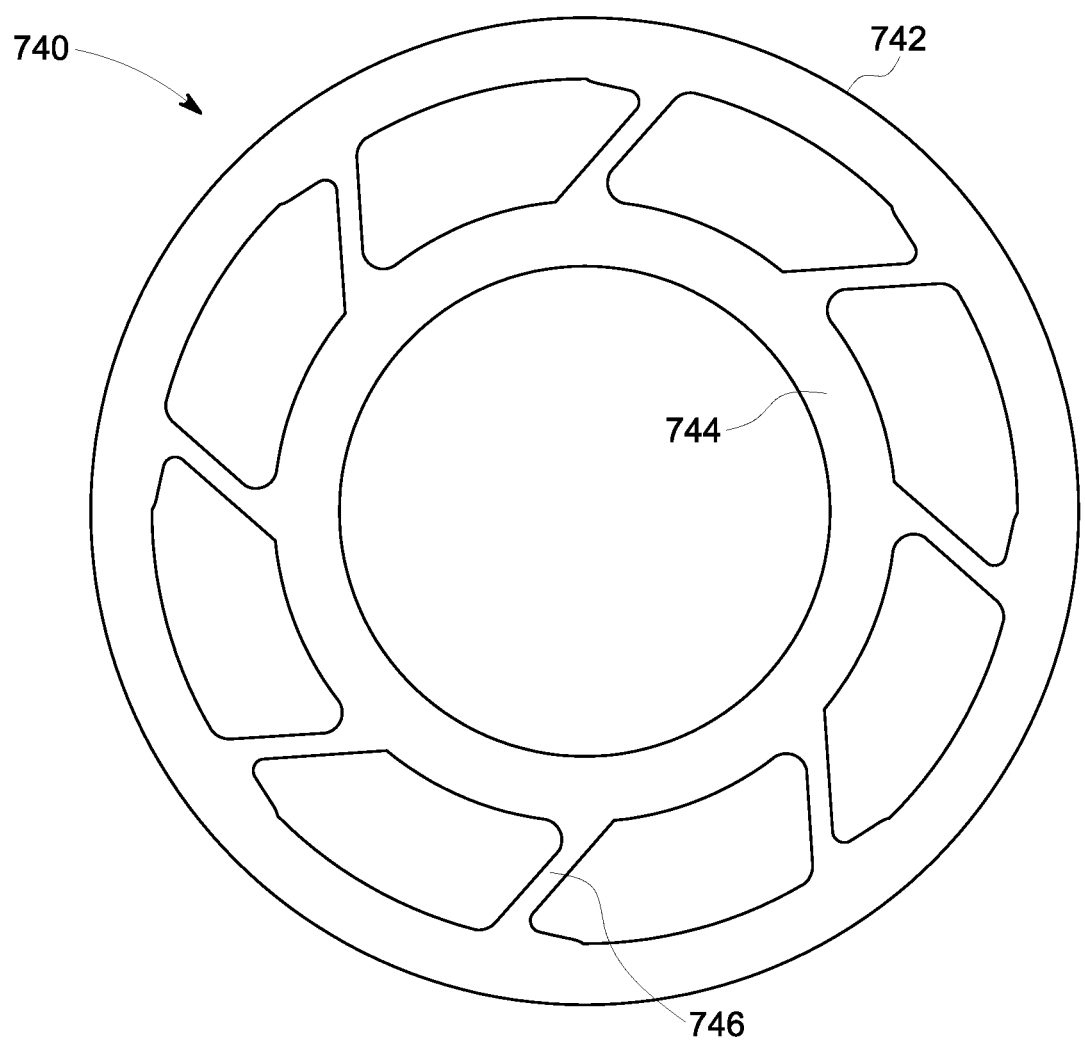
FIG. 10 is a schematic view of an insert in accordance with an embodiment of the invention.

FIG. 10 illustrates an insert 740 according to another embodiment of the invention. The insert 740 is configured and sized to be interference fit within a planet pin opening 118. The insert 740 includes an outer ring 742 connected to an inner ring 744 by a plurality of springs 746. The inner ring 744 is sized to receive a planet pin, such as pin 115. The springs 746 flex in response to a force directed at the pin.

Figure 11:
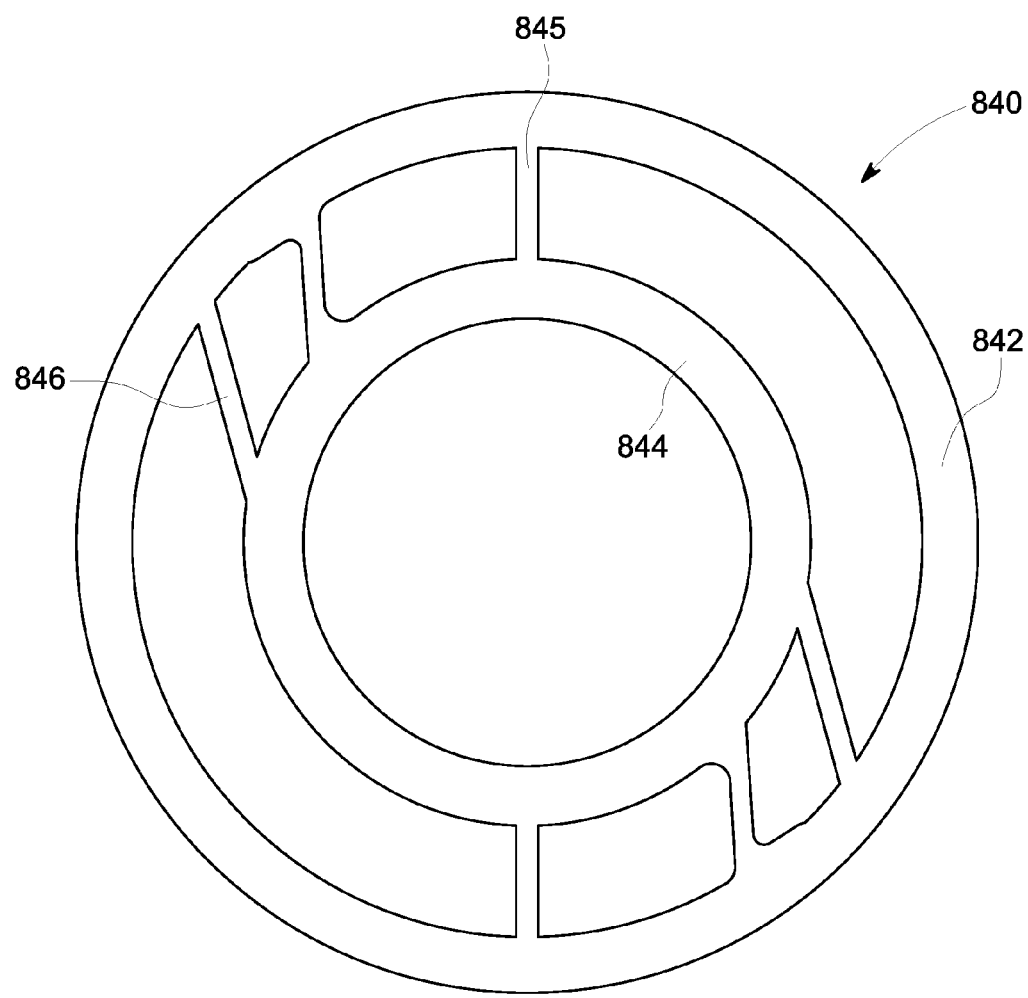
FIG. 11 is a schematic view of an insert in accordance with an embodiment of the invention.

FIG. 11 illustrates an insert 840 according to an embodiment of the invention, which like insert 740, is interference fit within a planet pin opening 118. The insert 840 includes an outer ring 842 separated from an inner ring 844. The outer ring 842 is connected to the inner ring 842 with a pair of stabilizers 845 and a plurality of springs 846. The inner ring 844 is sized to receive a planet pin, such as pin 115. The springs 846 flex in response to a force directed at the planet pin in a first direction. As shown, the stabilizers 845 extend along a midline of the insert 840. The stabilizers 845 inhibit flexing in response to a force directed at the planet pin in a second direction. The insert 840 can be installed in a planet pin opening 118 such that the first direction is a tangential direction and the second direction is a radial direction. In other words, the insert 840 can be installed such that the stabilizers 845 inhibit force in a radial direction on the planet pin.

Figure 12:
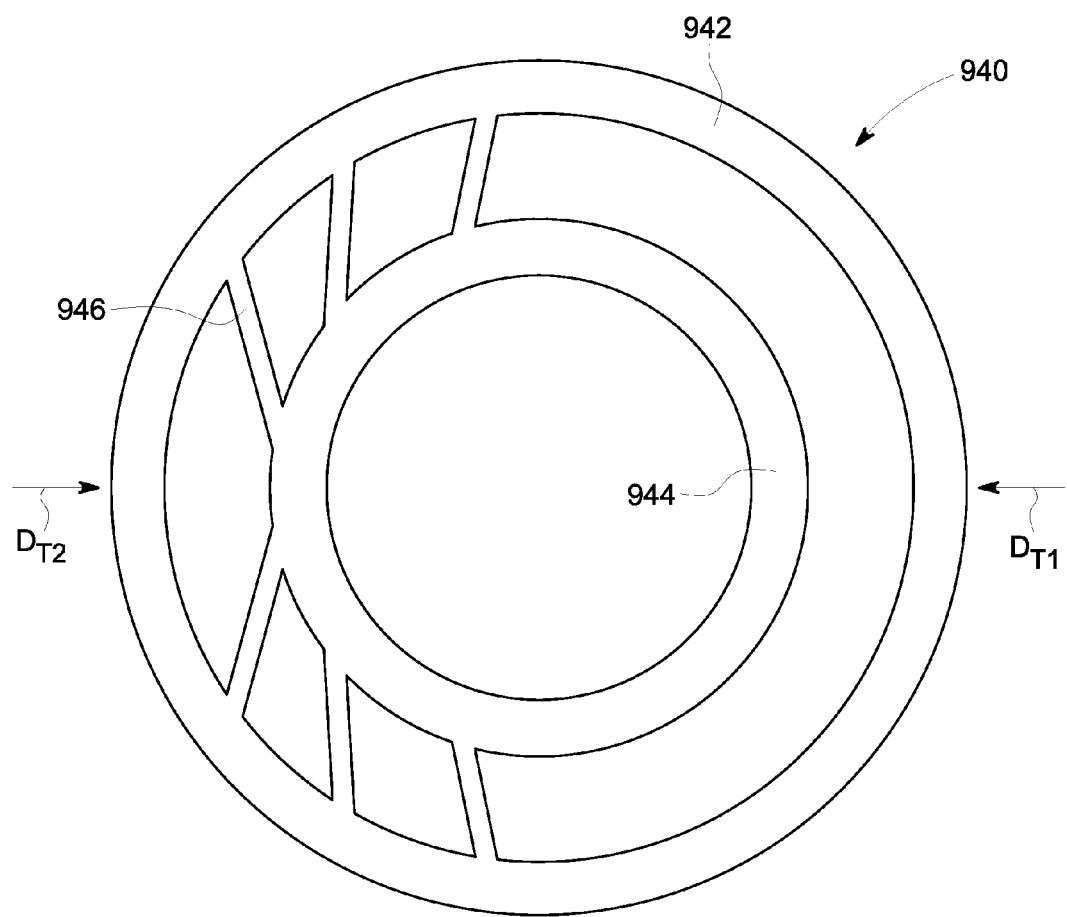
FIG. 12 is a schematic view of an insert in accordance with an embodiment of the invention.

FIG. 12 illustrates an insert 940 according to an embodiment of the invention. The insert 940 is sized to be interference fit within a planetary pin opening 118. The insert 940 includes an outer ring 942 connected to an inner ring 944 by a plurality of springs 946. The inner ring 944 is sized to receive a planet pin, such as planet pin 115.

The springs 946 are overloaded on one side of the insert 940. The springs 946 allow flexing of the planet pin in response to a force on the pin in a first direction. The insert 940 can be installed such that the springs 946 foster flexing in the first tangential direction but inhibit flexing in a second radial direction. Further, the overloading of the springs 946 on one side of the insert 940 allows greater flexing from force in one tangential direction $D_{T1}$ as opposed to force applied in an opposite tangential direction $D_{T2}$. Nonetheless, the inserts 940, like the inserts 540, can be installed to allow for flexing in both tangential directions $D_{T1}$ and $D_{T2}$. For example, pairs of the inserts 940 on opposite ends of one planet pin may be reversed so that the springs 946 are overloaded on the $D_{T2}$ direction side on one end of the planet pin and overloaded on the $D_{T1}$ direction side on the other end of the planet pin.

Figure 13:
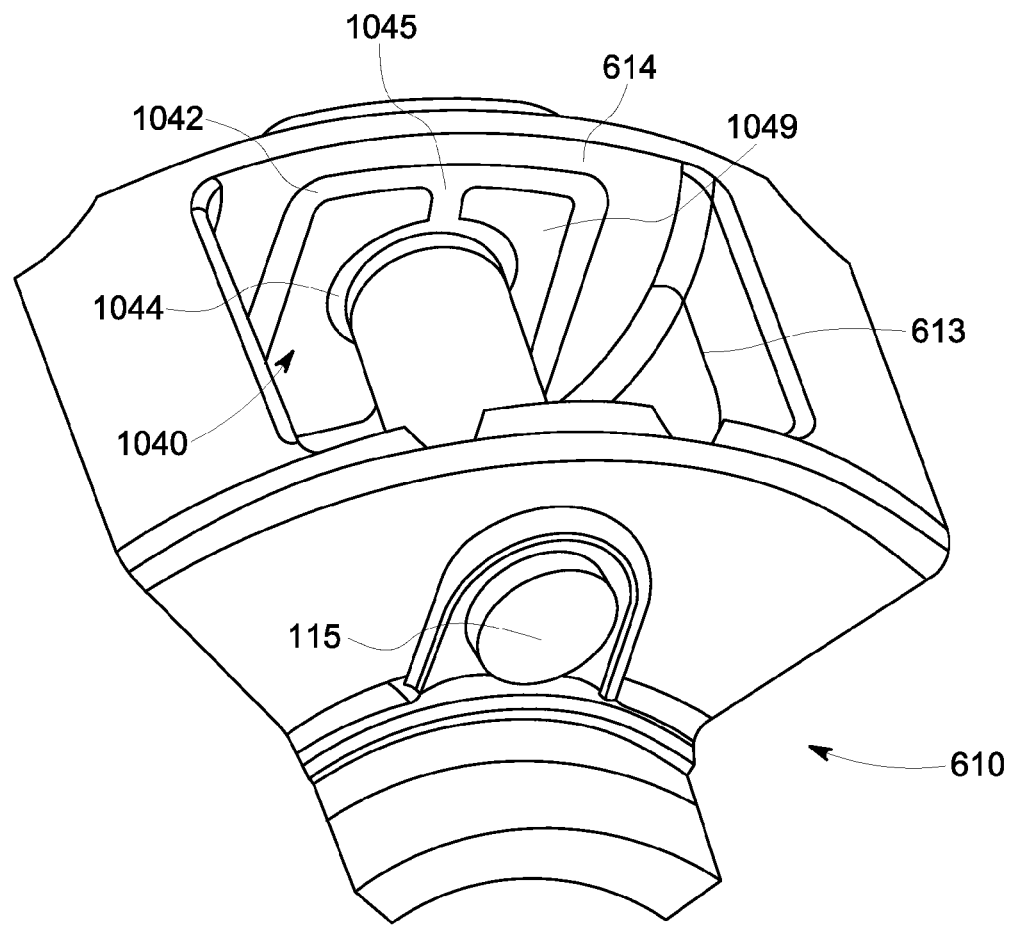
FIG. 13 is a partial perspective view of a carrier and insert in accordance with an embodiment of the invention.

FIG. 13 illustrates a partial carrier 610 and an insert 1040 according to an embodiment of the invention. A complete carrier 610 has a plurality of planetary gear openings 613 to receive planetary gears. Further, the carrier 610 has carrier openings 614 to accommodate inserts 1040. As shown, an opening 614 is formed on one side of the carrier 610 but not the other. It should be understood that the openings 614 may be formed on opposing sides of the carrier 610 to accommodate inserts 1040.

The insert 1040, which is sized to cause an interference fit within an opening 614, includes an outer ring 1042 connected to an inner ring 1044 by a pair of stabilizers 1045. The inner ring 1044 is sized to receive a planet pin 115. Filling in the space between the outer and inner rings 1042, 1044 is a stopper material 1049. The outer and inner rings 1042, 1044 are formed to be more compliant or flexible than the stopper material 1049. The outer and inner rings 1042, 1044 may be formed of a material having a higher strength than the stopper material 1049. For example, the outer and inner rings 1042, 1044 may be formed of steel, while the stopper material 1049 is formed of cast iron. Upon application of a tangential force, the greater compliancy of the outer and inner rings 1042, 1044 allow for flexing, which translates into tangential movement of the pin 115. The outer and inner rings 1042, 1044 can flex in response to normal, operating torque. Upon the application of extreme torque, the force of the torque is transferred to the stopper material 1049, thus causing the carrier to share in the load.

Figure 14:
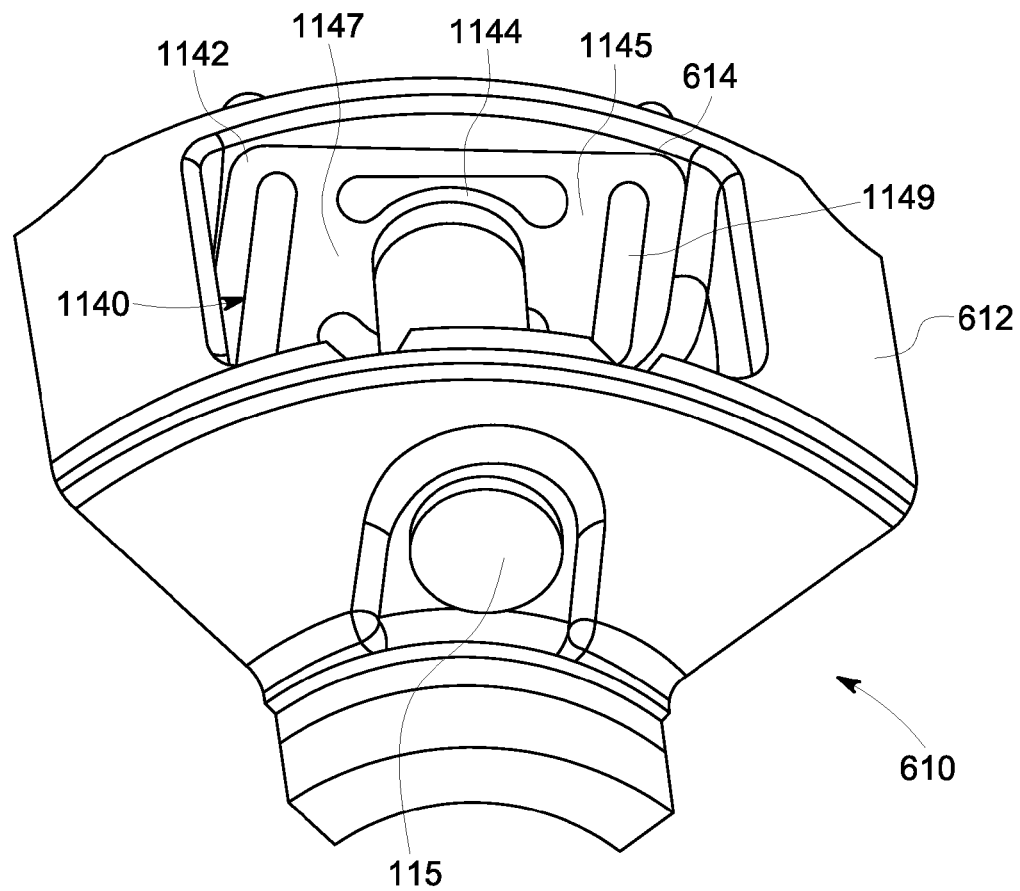
FIG. 14 is a partial perspective view of a carrier and insert in accordance with an embodiment of the invention.

FIG. 14 illustrates a partial carrier 610 and an insert 1140 according to an embodiment of the invention. The insert 1140 is configured and sized to be interference fit within the carrier openings 614. As shown, an opening 614 is formed on one side of the carrier 610 but not the other. It should be understood that the openings 614 may be formed on opposing sides of the carrier 610 to accommodate inserts 1140.

The insert 1140 includes an outer ring 1142 connected to an inner ring 1144 by a pair of stabilizers 1145 and stiffeners 1147. The inner ring 1144 is sized to receive a planet pin 115. Filling in the space between the outer and inner rings 1142, 1144 is a stopper material 1149. The outer and inner rings 1142, 1144 are formed to be more compliant or flexible than the stopper material 1149. For example, the outer and inner rings 1142, 1144 may be formed of steel, while the stopper material 1149 is formed of cast iron. A distinction between the insert 1040 (FIG. 13) and insert 1140 is the length of the stabilizers 1145. The longer stabilizers 1145 of insert 1140 allow for greater compliance in response to a tangentially directed force.

Upon application of a tangential force, the greater compliancy of the outer and inner rings 1142, 1144 allow for flexing, which translates into tangential movement of the pin 115. The outer and inner rings 1142, 1144 can flex in response to normal, operating torque. Upon the application of extreme torque, the force of the torque is combatted by the stiffeners 1147 and transferred to the stopper material 1149, thus causing the carrier to share in the load.

Figure 15:
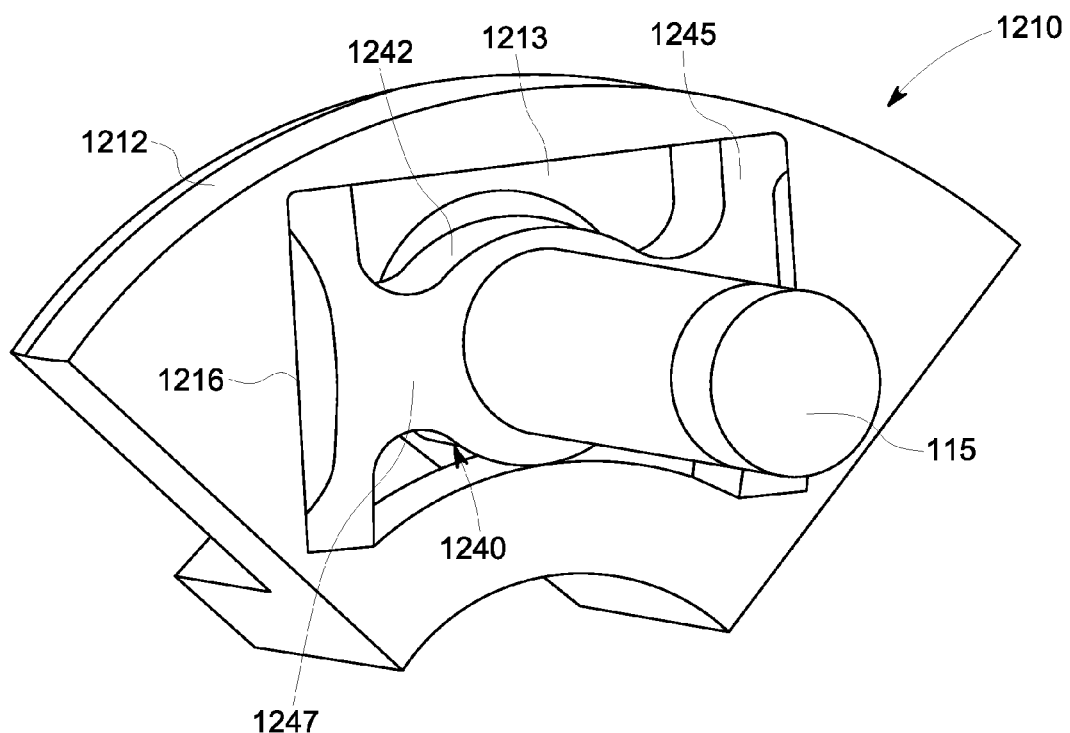
FIG. 15 is a partial cross-sectional view of a carrier and insert in accordance with an embodiment of the invention.

FIG. 15 illustrates a partial carrier 1210 and an insert 1240 according to an embodiment of the invention. The carrier 1210 has a carrier body 1212 that includes a plurality of carrier cut-outs 1213. Each cut-out 713 includes a wall 1216. An opening is formed in the carrier cut-outs 1213 to receive a planet pin 115.

The insert 1240 includes a ring 1242 sized and configured to receive the planet pin 115. Further, the insert 1240 includes a pair of stabilizers 1245 connected to the ring 1242 by a pair of stiffeners 1247. The stabilizers 1245 are not intimate with the cut-out walls 716 except at the corners. This arrangement allows the stabilizers to flex in response to a force tangentially directed on the pin 115, absorbing some of the torque. Filling in the remaining space within the cut-outs 1213 is a stopper material (not shown). The insert 1240 can withstand normal, operating torque. If extreme torque is experienced by the pin 115, the stabilizers 1245 will flex to a certain extent to absorb some of the torque, and then the remaining torque will be taken up by the stiffeners 1247 and the stopper material.

Figure 16:
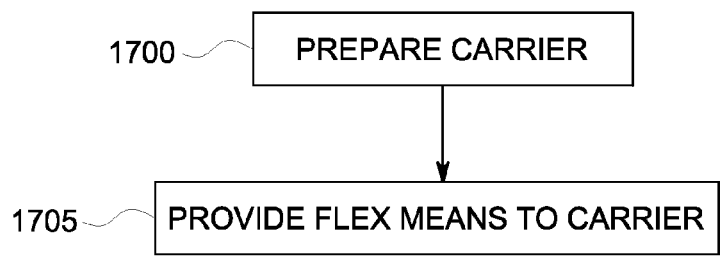
FIG. 16 illustrates a process for balancing a load on a planetary gear system.

Next, with particular reference to FIG. 16 and general reference to FIGS. 2-15, will be described a method for balancing a load on a planetary gear system. At step 1700 a carrier is prepared. Preparation of the carrier may include boring planet pin openings, such as opening 118, within a carrier. Preparation of the carrier also may include creating cut-outs within the carrier, such as cut-outs 316, 318 or cut-out 416 or cut-out 1213. With regard to cut-out 416, preparation of the carrier also may include splitting the carrier into two parts. Preparation of the carrier also may include creating slots, like slots 513, or carrier openings 614. Preparation of the carrier also may include forming the carrier, or at least one part of the carrier, out of a high strength material like steel.

At step 1705 a flex means is provided to the carrier. Provision of a flex means may include fitting spring inserts, like spring inserts 140, 240, 740, 840, or 940 within planet pin openings, like openings 118. Provision of a flex means may include adding compliant inserts, like compliant inserts 340 or compliant inserts 440, into, respectively, cut-outs 316, 318 or cut-outs 416. Provision of flex means may include adding inserts 540 into slots 513. Provision of flex means may include fitting inserts, like inserts 640, 1040, or 1140 within carrier openings 614. Provision of flex means may include fitting inserts 1240 within cut-outs 1213.

The embodiments of the invention described herein will enable an increase in torque capacity, as well as an improved load distribution, for a planetary gearbox. Further, these enhancements are enabled with a minimum of overall mass impact on the gearbox.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while embodiments have been described in terms that may initially connote singularity, it should be appreciated that multiple components may be utilized. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A planetary gear system, comprising:
   a carrier body configured to receive planet gears, said carrier body having an inner surface with a ring/neck cut-out portion and a base cut-out portion;
   at least one pin received by said carrier body; and
   a compliant insert positioned within the ring/neck and base cut-out portions of said carrier body, said compliant insert comprising a ring portion extending from a neck portion and configured to receive that at least one pin, and a base portion extending outwardly from a lower extent of the neck portion, said compliant insert positioned within said ring/neck and base cut-out portions in such a way that a gap exists between said ring and neck portions of said compliant insert and the ring/neck cut-out portion of said carrier body, and no gap exists between said base portion of said compliant insert and said base cut-out portion of said carrier body.

2. The planetary gear system of claim 1, wherein said carrier body is made of a first material, and wherein said compliant insert is made of a second material having a higher yield strength than the first material.

3. The planetary gear system of claim 2, wherein said carrier body further comprises a step-down line located between the ring/neck cut-out portion and the base cut-out portion of said carrier body.

4. The planetary gear system of claim 3 wherein said base portion of said compliant insert and said base cut-out portion are configured and sized such that there is an interference fit between compliant insert and said carrier body below said step-down line of said base cut-out portion of said carrier body.

5. The planetary gear system of claim 2, wherein the ring/neck cut-out portion of said carrier body includes a beveled edge, and wherein the ring portion of said compliant insert includes a beveled surface that contacts the beveled edge during higher than normal torque conditions of said planetary gear system.

6. A method of balancing a load on a planetary gear system comprising a plurality of planet gears mounted on a carrier through a plurality of planet pins, the method comprising:
   preparing a carrier body of the carrier with a ring/neck cut-out portion and a base cut-out portion on an inner surface of the carrier body; and
   providing a compliant insert between said planet pins and said carrier, said compliant insert positioned within the ring/neck and base cut-out portions of said carrier body, said compliant insert comprising a ring portion extending from a neck portion and configured to receive that at least one pin, and a base portion extending outwardly from a lower extent of the neck portion, said compliant insert positioned within said ring/neck and base cut-out portions in such a way that a gap exists between said ring and neck portions of said compliant insert and the ring/neck cut-out portion of said carrier body, and no gap exists between said base portion of said compliant insert and said base cut-out portion of said carrier body, thereby enabling movement of said planet pins in response to a force directed thereon.

* * * * *